United States Patent [19]

Kuniyoshi et al.

[11] 4,157,565

[45] Jun. 5, 1979

[54] APPARATUS FOR ELIMINATING TIME BASE ERRORS FROM AN INFORMATION SIGNAL

[75] Inventors: Yasunobu Kuniyoshi, Tokyo; Takashi Okada, Yamato; Takao Sumi, Tokyo, all of Japan

[73] Assignee: Sony Corporation, Tokyo, Japan

[21] Appl. No.: 862,054

[22] Filed: Dec. 19, 1977

[30] Foreign Application Priority Data

Dec. 17, 1976 [JP] Japan .................. 51-152749

[51] Int. Cl.² .............................................. H04N 5/76
[52] U.S. Cl. ............................................ 358/8; 360/36
[58] Field of Search ................. 358/8; 360/36, 33, 26; 331/20, 11

[56] References Cited

U.S. PATENT DOCUMENTS

| | | | |
|---|---|---|---|
| 3,614,305 | 10/1971 | Hidaka et al. | 360/36 X |
| 3,833,926 | 9/1974 | Hall | 360/135 |
| 3,845,502 | 10/1974 | Paus | 360/86 |
| 3,947,893 | 5/1976 | Hall, Sr. | 360/133 |
| 3,974,520 | 8/1976 | Kuroyanagi | 358/8 X |
| 4,012,774 | 3/1977 | Kuniyoshi et al. | 358/8 |
| 4,060,839 | 11/1977 | Meadows | 360/99 |
| 4,063,295 | 12/1977 | Mann et al. | 360/99 |
| 4,069,462 | 1/1978 | Dunn | 331/11 |

*Primary Examiner*—Bernard Konick
*Assistant Examiner*—Donald E. McElheny

*Attorney, Agent, or Firm*—Lewis H. Eslinger; Alvin Sinderbrand

[57] ABSTRACT

Apparatus for eliminating time base errors from a carrier-modulated information signal, such as a color video signal which is reproduced from a record medium. A circuit including a variable oscillator generates a carrier signal of controllable frequency and phase. An automatic frequency control circuit detects the time base frequency error in the carrier-modulated information signal and produces a frequency error signal proportional to the detected frequency error. An automatic phase control circuit detects a time base phase error in the carrier-modulated information signal and produces a phase error signal proportional to the detected phase error. A switching circuit selectively supplies either the frequency error signal or the phase error signal as a control signal to the variable oscillator so as to correspondingly control the frequency and phase of the generated carrier signal in a manner to eliminate such frequency and phase errors, the frequency and phase error signals being supplied to the variable oscillator during selected, mutually exclusive intervals. A frequency converter is provided with the controlled carrier signal and with the information signal so as to convert the carrier of the information signal with the generated, controlled carrier such that the frequency-converted information signal has a carrier of substantially constant frequency and phase.

28 Claims, 6 Drawing Figures

APPARATUS FOR ELIMINATING TIME BASE ERRORS FROM AN INFORMATION SIGNAL

BACKGROUND OF THE INVENTION

This invention relates to apparatus for eliminating time base errors in an information signal and, more particularly, to such apparatus which finds ready application in conjunction with a color video signal which is reproduced from a record medium, whereby time base errors which may be present in the chrominance component of the color video signal are eliminated.

Various devices have been developed for the recording and reproduction of signal information, and particularly video signal information which has a composite color video signal. Examples of such devices include the video tape recorder (VTR) wherein one or more rotary heads scan successive parallel skewed tracks across the surface of a magnetic tape for recording and/or reproducing color video signals from such tracks, magnetic sheet recorders wherein a magnetic sheet is used as the record medium upon which color video signals are recorded in parallel record tracks, and a video disc recorder wherein video signals are recorded in a spiral track or in substantially concentric circular tracks and are reproduced from such tracks by magnetic recording/reproducing apparatus, optical apparatus, and the like. The problem of time base errors in the video signals which are reproduced by the above-mentioned devices is generally common to all of such devices; and to facilitate an explanation thereof, the following discussion is directed specifically to VTR's.

In a typical VTR, the luminance and chrominance components are separated from the color video signal and are processed in separate channels wherein the luminance signal is frequency modulated to a relatively high frequency band while the chrominance component is frequency-converted to a lower frequency band which is below the FM luminance band. These separately processed components then are recombined and recorded simultaneously in successive, skewed record tracks. During a signal reproduction operation, the FM luminance and frequency-converted chrominance components are separated from the reproduced color video signal and are respectively demodulated and frequency reconverted back to their original frequency bands. Then, the recovered luminance and chrominance components are recombined to form the composite color video signal.

In general, the reproduced color video signals contain time base errors, so-called jitter, due to mechanical vibrations in the tape transport mechanism, fluctuations in the rotation of the heads, errors in the speed at which the tape is transported, stretching or shrinkage of the tape since the video signals had been recorded thereon, and other parameters and conditions which will cause time base errors. While these errors typically have only a negligible effect upon the luminance component of the reproduced video signal, they have a particularly serious effect upon the chrominance component, whereby the hue of the reproduced color television picture may be distorted.

One proposal for eliminating or cancelling such time base errors from the reproduced chrominance component provides an automatic frequency control (AFC) circuit for controlling the frequency of the frequency re-converting carrier which is used in the chrominance channel to reconvert the carrier of the chrominance component back to its original frequency. In this AFC circuit, frequency errors in the reproduced chrominance component are detected, and a variable oscillator, such as a voltage-controlled oscillator (VCO) is adjusted to provide an oscillating signal, from which the frequency re-converting signal is derived, so as to cancel the frequency error. The frequency error is deteched by comparing the frequency of the reproduced horizontal synchronizing signals with the frequency of the VCO output. While this AFC operation generally is effective to eliminate relatively large-scale time base errors, such as those time-base errors which influence the frequency of the reproduced horizontal synchronizing signal, the AFC operation has no effect upon relatively small time base errors which may occur in those line intervals which occur between successive horizontal synchronizing signals.

The aforementioned relatively small time base errors appear as fluctuations in the subcarrier of the chrominance component upon which the color information signals are modulated. In one proposal for eliminating such relatively small time base errors, an automatic phase controlled (APC) circuit is used to detect phase errors in the reproduced chrominance subcarrier. In this APC circuit, a highly stable reference carrier is generated and the phase of the reproduced chrominance subcarrier is compared to this reference carrier. In a typical embodiment, the APC circuit is used in conjunction with the AFC circuit, the latter including the aforedescribed VCO circuit, and any phase error which is detected by the APC circuit is used to control the VCO circuit so as to adjust the frequency reconverting signal derived therefrom, whereby such phase errors are eliminated. The reason for providing the APC circuit in conjunction with AFC circuit is to provide adjustments in the frequency reconverting signal in the event that the time base errors which are present in the reproduced color video signal exceed the limited lock-in range of the APC circuit.

In one embodiment of a time base error correcting circuit which uses both an AFC circuit and an APC circuit (known as an AFPC circuit), such as the AFPC described in U.S. Pat. No. 3,723,638, the frequency error control signal which is obtained by detecting the time base frequency error and the phase error control signal which is obtained by detecting the time base phase error are added, and the resultant control signal is used to control the VCO. However, there may be some instances when the frequency and phase error control signals tend to attain opposite adjustments in the frequency reconverting signal. This impedes rapid and satisfactory cancellation or elimination of the time base errors.

The problem of oppositely acting control signals in time base error correcting apparatus is addressed in copending application Ser. No. 851,408 entitled "Time Base Error Correcting Apparatus" filed Nov. 14, 1977 by Kuniyoshi et al. In this copending application, the VCO is controlled with the frequency error signal produced by the AFC circuit only when the time base error in the reproduced video signal is beyond the lock-in range of the APC circuit. The present invention is directed to another technique for solving the problem of oppositely acting frequency and phase error signals in an AFPC circuit.

OBJECTS OF THE INVENTION

Therefore, it is an object of the present invention to provide improved apparatus for eliminating time base errors from an information signal.

Another object of this invention is to provide apparatus for removing time base errors from the chrominance component of a color video signal which is reproduced from a record medium.

A further object of this invention is to provide time base error correcting circuitry which provides frequency and phase error control signals in response to detected time base frequency and phase errors in an information signal, and wherein these error signals are used in mutually exclusive relation to eliminate such time base errors.

An additional object of this invention is to provide time base error correcting circuitry for use in color television reproducing apparatus wherein a control signal is used to eliminate time base phase errors during some of the field intervals of the color television signal and another control signal is used to eliminate time base frequency errors during the remaining field intervals.

Yet another object of this invention is to provide automatic frequency and phase control circuitry for use in video signal reproducing apparatus wherein time base error correcting circuitry incorporated therein is switched between automatic frequency and automatic phase control operations at selected intervals.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for eliminating time base errors from an information signal, such as from a reproduced color video signal. A circuit including a variable oscillator generates a carrier signal of controllable frequency and phase, this carrier signal being used to convert the carrier upon which the time base error information signal is modulated. An automatic frequency control circuit detects a time base frequency error in the carrier-modulated information signal and produces a frequency error signal in response thereto. An automatic phase control circuit detects a time base phase error in the carrier-modulated information signal and produces a phase error signal proportional thereto. A switching circuit selectively supplies either the frequency error signal or the phase error signal as a control signal to the variable oscillator to correspondingly control the frequency and phase of the carrier signal which is derived therefrom, the frequency and phase error signals being supplied to the variable oscillator during selected, mutually exclusive intervals. The controlled carrier is supplied to a frequency converter whereat the carrier of the carrier-modulated information signal is converted to a new carrier having substantially constant frequency and phase.

BRIEF DESCRIPTION OF THE DRAWINGS

The following detailed description, given by way of example, will best be understood in conjunction with the accompanying drawings in which.

DETAILED DESCRIPTION OF A CERTAIN PREFERRED EMBODIMENT

Figure 1:
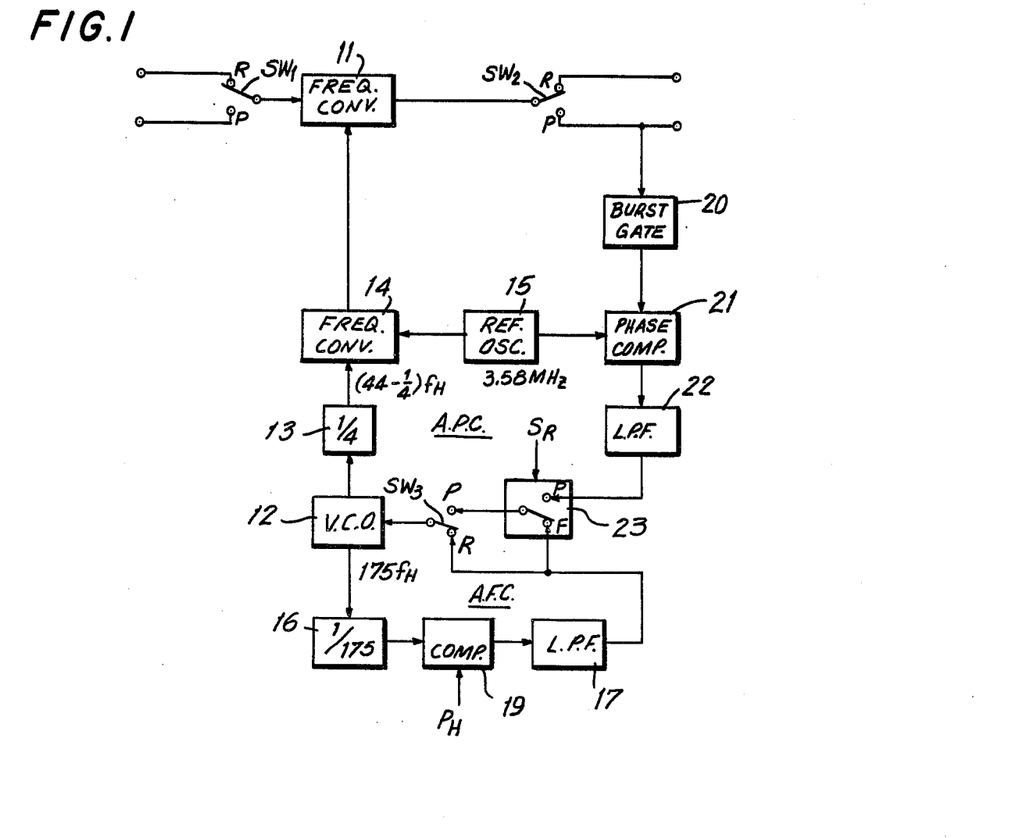
FIG. 1 is a block diagram of one embodiment of the present invention.

Turning now to the drawings, wherein like reference numerals are used throughout, one embodiment of the present invention is shown in FIG. 1. For the purpose of the present discussion, it will be assumed that the illustrated embodiment is used in conjunction with a video signal record/playback device, such as a VTR. Furthermore, and in the interest of simplification, it will be assumed that one of the elements illustrated in FIG. 1, namely frequency converter 11, is capable of being used both during a recording operation and in a reproducing operation. In a preferred embodiment shown in FIG. 2, frequency converter 11 is shown as being formed of two frequency converting circuits, one for use during a signal recording operation and the other for use during a signal reproducing operation. The apparatus shown in FIG. 1 includes time base error correcting circuitry 10 which is adapted to eliminate time base frequency and phase errors in the reproduced signal. Circuitry 10 includes an AFC circuit comprised of a voltage controlled oscillator (VCO) 12 and a comparator 19, and an APC circuit comprised of a reference oscillator 15, a phase comparator 21 and VCO 12.

More particularly, in the AFC circuit, comparator 19, which my be a phase comparator, includes one input coupled to receive horizontal synchronizing signals $P_H$ which are included in a video signal, and another input connected to receive an oscillating signal derived from the output of VCO 12. As one example, the frequency of the oscillating signal produced by the VCO is $175f_H$, where $f_H$ is equal to the horizontal synchronizing signal frequency, that is, the repetition rate of the line intervals in the video signal, and a frequency divider 16 is connected between VCO 12 and comparator 19 so as to divide the frequency of the oscillating signal by a suitable factor. As shown, the dividing ratio of frequency divider 16 is 1/175 such that the frequency of the signal derived from VCO 12 is equal to the horizontal synchronizing signal frequency. Comparator 19 is adapted to produce a frequency error signal which, for example, is proportional or otherwise related to the frequency difference between the signals which are applied thereto. That is, this frequency error signal represents the detected frequency error between the oscillating signal produced by VCO 12 and the horizontal synchronizing signals. A low pass filter 17 is connected to the output of comparator 19 so as to feed back a DC frequency error signal to VCO 12. In this regard, the frequency error signal may be transmitted to VCO 12 via the recording contact R of a record/playback changeover switch $SW_3$ or, in a reproducing mode, via a switch 23, to be described, and thence through the playback contact P of switch $SW_3$. As is appreciated, the frequency error signal is adapted to control VCO 12 so as to lock the frequency of the oscillating signal produced by the VCO to the frequency of the horizontal synchronizing signals.

Before describing the APC circuit, the function of frequency converter 11 first will be discussed. As mentioned above, in a typical video signal recording system, such as in a VTR, the chrominance component of an original color video signal is frequency converted to a frequency band below its original band and, moreover, below the frequency band occupied by the frequency-modulated luminance signal. The purpose of frequency converter 11, in the recording mode, is to perform this frequency conversion operation. Frequency converter 11 may, for example, comprise a heterodyning circuit, such as a balanced modulator, or the like. As a numerical example, the subcarrier frequency of the chrominance component included in an original color video signal may be 3.58 MHz. Frequency converter 11 is adapted to convert this subcarrier frequency to 688 KHz. During a recording operation, record/reproduce change-over switches $SW_1$ and $SW_2$ engage their respective recording contacts R, whereby frequency converter 11 receives the chrominance component of an original color video signal and supplies the frequency-converted chrominance component to, for example, a mixing circuit (not shown) for recombining with the frequency-modulated luminance component and for subsequent recording therewith. To effect the aforementioned frequency conversion of the chrominance component, a frequency converting signal is applied to frequency converter 11. If the 3.58 MHz subcarrier frequency is represented as $f_S$, and if the converted 688 KHz. subcarrier frequency is represented as $f_c$, then the frequency of the frequency converting signal applied to frequency converter 11 preferably is expressed as $f_S + f_c$. This frequency converting signal is produced by a frequency converter 14, which may be a heterodyning circuit, such as a balanced modulator, a mixer, or the like, to which a reference carrier of substantially fixed frequency and phase, and having a frequency $f_s$, and a controllable oscillating signal of frequency $f_c$ are applied. The reference carrier is generated by a reference oscillator 15 having an oscillating frequency of 3.58 MHz. Preferably, this reference oscillator is a highly stable oscillator such that the reference carrier generated thereby is of fixed frequency and phase over long periods of time. The oscillating signal of frequency $f_c$ is derived from VCO 12. In particular, a frequency divider 13 having a dividing ratio of ¼ is connected between the VCO and frequency converter 14. This dividing ratio is selected such that the frequency $f_c = (44-\frac{1}{4})f_H$. The reason for selecting the frequency $f_c$ in this manner is described in greater detail with respect to FIG. 2.

During a recording operation, it is appreciated that the AFC circuit locks the oscillating frequency of VCO 12 in synchronism with the horizontal synchronizing signal frequency of the video signal to be recorded. Thus, the chrominance component is frequency converted to its lower subcarrier frequency which is synchronized with the horizontal synchronizing frequency and, thus, with the original subcarrier frequency. During this recording operation, the APC circuit is not utilized. However, when a reproducing operation is selected, as by suitably operating switches $SW_1$ and $SW_2$ to engage their respective playback contacts P, the APC circuit is employed to eliminate time base phase errors.

Turning now to the illustrated APC circuit, a phase comparator 21 is adapted to detect a phase error between the fixed reference carrier generated by reference oscillator 15 and the phase of the chrominance subcarrier which is reproduced from the recorded color video signals. In this regard, a burst gate 20 is connected to the output of frequency converter 11 via the P contact of switch $SW_2$ and is adapted to extract the burst signal from the reconverted chrominance component. In the absence of time base errors, it is expected that the reconverted subcarrier, or burst signal, has a frequency identical to that of the reference carrier and, moreover, that the phase of this subcarrier coincides with the phase of the reference carrier. Phase comparator 21 functions to produce a time base phase error signal at the output thereof, this error signal being proportional to or otherwise a function of the detected phase error between the reconverted chrominance subcarrier and the reference carrier. This phase error signal is supplied through a low pass filter 22 and is applied as a DC phase error signal through switch 23 and via the P contact of switch $SW_3$ to VCO 12. Hence, the phase of the oscillating signal produced by VCO 12 is adjusted in accordance with the DC phase error signal derived from phase comparator 21. As may be appreciated, the phase of the oscillating signal produced by the VCO is adjusted by changing the frequency of the VCO.

In the signal reproducing mode, the AFC circuit operates in a manner which is substantially similar to its operation during a recording mode. During signal reproduction, the horizontal synchronizing signals $P_H$ which are applied to comparator 19 are derived from the reproduced color video signal. The comparator in the AFC circuit again functions to produce a frequency error signal which represents the error between the signal derived from VCO 12 and the horizontal synchronizing signals. Low pass filter 17 applies a DC frequency error signal to switching circuit 23, the latter being adapted to selectively apply either the frequency error signal or the phase error signal applied thereto to the VCO.

It is recalled that, contrary to other time base error correcting techniques, and particularly other proposals for AFPC circuits, the present invention is adapted to apply the frequency and phase error signals to VCO 12 during selected, mutually exclusive time intervals. When the frequency error signal is applied by switch 23 to the VCO, the oscillating signal produced by VCO 12 is adjusted in a direction so as to eliminate the time base frequency errors in the reproduced chrominance component. Also, when switch 23 applies the phase error signal to the VCO, the oscillating signal produced by VCO 12 is adjusted in a direction so as to eliminate the time base phase errors in the chrominance component. In the event that the time base error in the chrominance component exceeds the lock-in range of the APC circuit, it is appreciated that the periodic application of the frequency error signal to VCO 12 tends to reduce this time-base error to a magnitude within the lock-in range of the APC circuit, thereby enabling the latter circuit to eliminate time base errors in the chrominance component. Switching circuit 23 is controlled by a switch control signal $S_R$ for determining which of the frequency and phase error signals are coupled through the switching circuit to VCO 12. The effect of switching circuit 23 essentially is present during a signal reproduction operation by reason of the presence of switch $SW_3$ which connects switching circuit 23 to the VCO. The control circuit which is provided for generating switch control circuit $S_R$ is described in detail with respect to FIG. 2. Suffice it to say that this control signal preferably exhibits a rectangular waveform having relatively high and low DC levels. Switch 23 is responsive to a high level of control signal $S_R$ to couple the frequency error signal applied thereto to VCO 12. Conversely, switching circuit 23 is responsive to the low level of control signal $S_R$ to couple the phase error signal applied thereto to VCO 12. Control signal $S_R$ has a frequency related to the field repetition rate of the reproduced color video signal, such as a frequency equal to 1/n times the field interval repetition rate. Hence, switching circuit 23 couples the frequency error signal, that is, the output of the AFC circuit, to VCO 12 during each n-th field interval, while coupling the phase error signal, that is, the output of the APC circuit, to the VCO during all other field intervals. In one example, n is equal to 10, such that VCO 12 is subjected to AFC control during one out of every ten field intervals, while the VCO is subjected to APC control during nine out of ten field intervals. Of course, if desired, n may be any other suitable integer whereby VCO 12 is subjected to AFC control at sufficient periods to return the time base error of the reproduced chrominance component to the lock-in range of the APC circuit. As may be appreciated, if AFC control over VCO 12 is performed too infrequently, the time base error of the reproduced chrominance component may remain outside the lock-in range of the APC circuit.

Figure 2:
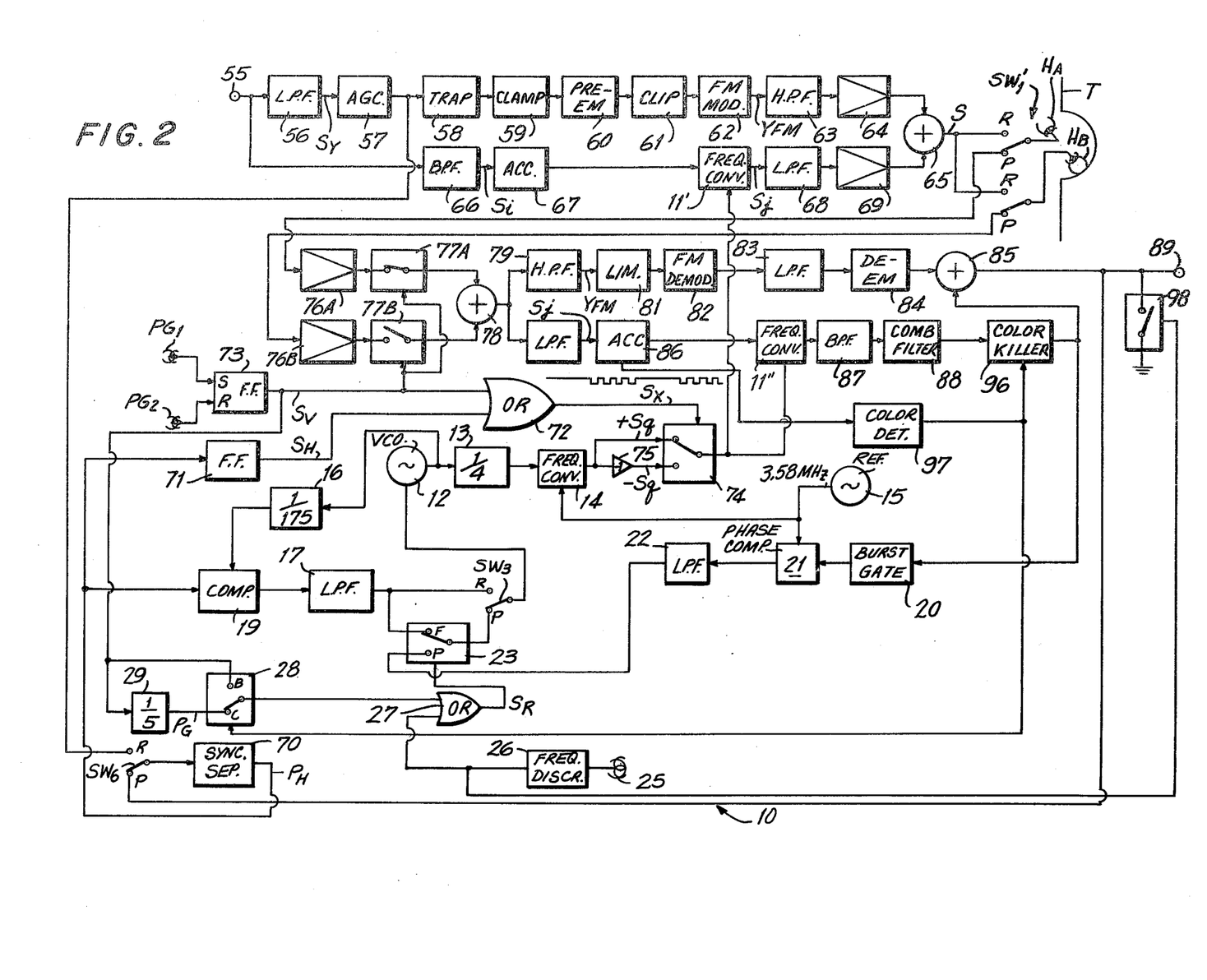
FIG. 2 is a block diagram of video signal recording/reproducing apparatus with which the present invention can be used.

Referring now to FIG. 2, it will be seen that the present invention may be advantageously employed for eliminating time base errors in the chrominance component of a color video signal which is recorded and reproduced by, for example, a VTR which may be of the so-called helical scan type, and particularly in such a VTR in which interfering signals due to crosstalk in respect to the chrominance component are eliminated by recording the chrominance component with different carriers in adjacent oblique or skewed parallel tracks on a magnetic tape. Of course, as will be apparent, the apparatus shown in FIG. 2 may be of the type which uses a magnetic sheet or a magnetic disc as the recording medium.

In the recording section of the apparatus shown in FIG. 2, an input terminal 55 receives a color video signal to be recorded and which includes luminance and chrominance components composed of line, field and frame intervals with blanking and synchronizing portions in each of those intervals, such as an NTSC-type color video signal. Such color video signal is applied from terminal 55 to a low pass filter 56 which transmits substantially only the luminance component $S_Y$ to an automatic gain control circuit 57. The gain controlled luminance component from circuit 57 is applied through a trap circuit 58 to a clamp circuit 59 which clamps the sync-tip level of the luminance component to a fixed reference level. Thereafter, the clamped luminance component is passed through a pre-emphasis circuit 60 to a clip circuit 61 and, through the latter, to a frequency modulator 62 in which the luminance component frequency modulates a suitably high frequency carrier. The resulting frequency modulated luminance component $Y_{FM}$ issuing from modulator 62 is passed through a high-pass filter 63 and a recording amplifier 64 to one input of an adding or mixing circuit 65.

The color video signal applied to input terminal 55 is also supplied from the latter to a band pass filter 66 which separates the chrominance component $S_i$ from the color video signal and passes such chrominance component through an automatic color control circuit 67 to a frequency converter 11' which may correspond to the frequency converter 11 described above with respect to FIG. 1, and in which the chrominance component is converted to a frequency band lower than that of the frequency modulated luminance component $Y_{FM}$ supplied to mixing circuit 65. The resulting frequency converted chrominance component $S_j$ is supplied from frequency converter 11' through a low pass filter 68 and a recording amplifier 69 to another input of mixing circuit 65 so as to be combined in the latter with the frequency modulated luminance component $Y_{FM}$ for providing a composite signal S which, in the recording mode of the apparatus, is supplied through record contacts R of a change-over switch, such as record/playback switch SW'$_1$ to rotary magnetic recording and reproducing heads H$_A$ and H$_B$.

In one embodiment of the apparatus illustrated in FIG. 2, heads H$_A$ and H$_B$ are substantially diametrically opposed and rotatably driven, as by a motor (not shown), to alternately scan oblique tracks extending across a tape T as the latter is translated longitudinally, as by a motor-driven capstan (not shown), in a path that extends helically about a portion of the periphery of a guide drum (not shown) associated with the rotary heads. Alternatively, heads H$_A$ and H$_B$ may scan tracks across a magnetic sheet, with relative translation being provided between the magnetic sheet and the rotating heads. A suitable conventional servo system (not shown) may be provided for regulating the rotary movements of heads H$_A$ and H$_B$ so that the heads commence to move along respective tracks on tape T at the commencement of alternating field intervals of the color video signal being applied to input terminal 55 for recording on the tape.

The gain controlled luminance component from circuit 57 is further shown to be applied through a record contact R of a record/playback switch SW$_6$ to a horizontal synchronizing signal separator 70 which separates the horizontal synchronizing signals $P_H$ therefrom for application to comparator 19. The separated horizontal synchronizing signals $P_H$ are also applied to a flip-flop 71 which provides a rectangular waveform or control signal $S_H$ having alternating high and low intervals each with a duration of one line interval of the video signal, and such control signal $S_H$ is applied to one input of an OR circuit 72. Another input of OR circuit 72 is connected to a flip-flop 73 to receive therefrom a rectangular waveform or signal $S_V$ having alternating high and low intervals each with a duration equal to one field interval of the video signal being recorded so that, for example, the control signal $S_V$ is at a high level during the scanning of each track on the tape T by the head H$_A$ and the control signal $S_V$ is at a low level during the scanning of each track on the tape T by the head H$_B$. In order to provide the described rectangular waveform or control signal $S_V$, flip-flop 73 may be controlled by pulse generators PG$_1$ and PG$_2$ which are suitably associated with a shaft (not shown) for rotating heads H$_A$ and H$_B$ so as to indicate the rotational positions of the latter. For example, pulse generator PG$_1$ may provide a pulse for setting flip-flop 73 at the commencement of each scanning movement of head H$_A$ across tape T, while pulse generator PG$_2$ provides a pulse for resetting flip-flop 73 at the commencement of each scanning movement of head H$_B$ across the tape. As is appreciated, the pulses produced by pulse generators PG$_1$ and PG$_2$ are synchronized with the field repetition rate of the video signal being recorded, whereby flip-flop 73 is set and reset in corresponding synchronism.

As a result of the described rectangular waveforms $S_H$ and $S_V$ applied to OR circuit 72, an output or control signal $S_X$ is obtained from the OR circuit which remains at a constant level, such as a relatively high potential, for the entire duration of each field interval recorded by head $H_A$ in a respective track on tape T, and which alternates, or switches, between relatively high and low levels, in accordance with the setting and resetting of flip-flop 73 during alternate line intervals of each field interval recorded by head $H_B$ in a next adjacent track. In the apparatus illustrated in FIG. 2, such output or control signal $S_X$ from OR circuit 72 is employed for controlling the establishment of different carriers for the frequency converted chrominance component $S_j$ to be recorded in tracks that are next adjacent to each other, with such carriers differing from each other in their polarity characteristics as described in detail in U.S. Pat. Nos. 3,925,910, 4,007,482 and 4,007,484, each of which has a common assignee herewith.

It will also be seen that the apparatus of FIG. 2 includes a circuit according to this invention, for processing the chrominance component, which is of the type previously described with reference to FIG. 1, and which is also generally identified by the reference 10. Such circuit 10 has its several components identified by the same reference numerals that were used in describing the corresponding components in FIG. 1.

More particularly, in the recording mode where the chrominance component is to be converted in frequency converter 11' from a standard color subcarrier frequency $f_S$ of 3.58 MHz. to a relatively low color subcarrier frequency $f_c$ of 688 KHz., that is, $f_c = (44 - \frac{1}{4})f_H$, the circuit 10 for providing the necessary frequency converting signal includes a variable frequency oscillator or VCO 12 generating a signal with a center frequency of $175f_H$. Such oscillating signal with a center frequency of $175f_H$ is applied to a frequency divider 13 which divides the frequency of the oscillating signal by four so as to provide an output signal with the frequency $(44-\frac{1}{4})f_H$. Such output signal from frequency divider 13 is applied to frequency converter 14 which also receives the reference carrier having the standard color subcarrier frequency $f_S = 3.58$ MHz from fixed frequency or reference oscillator 15, with the result that frequency converter 14 provides a frequency converring signal $S_q$ having the frequency $f_S + (44 - \frac{1}{4})f_H$.

In the apparatus of FIG. 2, the output of frequency converter 14 is applied without change, as indicated at $+S_q$, to one input of a switching circuit 74, and the output of converter 14 is also applied to an inverting circuit 75 so as to obtain a frequency converting signal $-S_q$ of opposite phase or polarity to the frequency converting signal $+S_q$ and which is applied to another input of switching circuit 74. Switching circuit 74 is effective to selectively apply the frequency converting signals $+S_q$ and $-S_q$ to frequency converter 11', under the control of control signal $S_x$ from OR circuit 72, so that frequency converting signal $+S_q$ is applied to converter 11' whenever control signal $S_x$ is of a high level, and frequency converting signal $-S_q$ is applied to converter 11' whenever control signal $S_x$ is of a low level. Frequency converting signals $+S_q$ and $-S_q$ selectively applied to frequency converter 11' are effective in the latter to convert the carrier to the chrominance component from its original carrier frequency $f_S$ to a relatively lower carrier frequency of $(44-\frac{1}{4})f_H$. As a result of the foregoing, the frequency converted chrominance component $S_j$ applied from frequency converter 11' through filter 68 and amplifier 69 to mixing or adding circuit 65 has a frequency band lower than that of the frequency modulated luminance component $Y_{FM}$. During intervals when the frequency converting signal $-S_q$ is applied to frequency converter 11', the polarity or phase of the carrier of the frequency converted chrominance component $S_j$ is reversed as compared with the phase or polarity of such carrier during the intervals when the frequency converting signal $+S_q$ is applied to frequency converter 11'.

It will also be noted that the carrier frequency $f_c$ of the frequency converted chrominance component $S_j$ satisfies the equation $f_c = \frac{1}{4}f_H(2m-1)$, in which m is a whole positive integer. Of course, in the present example in which $f_c = (44-\frac{1}{4})f_H$, the value m in the above equation is 88.

As a result of the described selection of the carrier frequency of the frequency converted chrominance component $S_j$, the second harmonic of the carrier of the frequency converted chrominance component is interleaved with the luminance component so as to avoid beat interference therebetween. By avoiding such beat interference, the frequency converted chrominance component can be recorded with a relatively high amplitude in respect to the amplitude of the frequency modulated luminance component for obtaining a good signal-to-noise (S/N) ratio of the chrominance component. When the frequency converted chrominance component $S_j$ and the frequency modulated luminance component $Y_{FM}$ are combined in mixing circuit 65 to provide the combined or composite signal S for recording by heads $H_A$ and $H_B$ in successive parallel tracks on tape T, the frequency converted chrominance component may amplitude modulate the frequency modulated luminance component.

Continuing with the description of processing circuit 10 in FIG. 2, it will be seen that, as previously described in connection with FIG. 1, the oscillating signal from VCO 12 is further applied to a frequency divider 16 in which the received signal has its frequency divided by 175. The output of frequency divider 16 is supplied to comparator 19 for comparison therein with the horizontal synchronizing signals $P_H$ having the frequency $f_H$ and which are separated from the luminance component of the color video signal being recorded by means of the separator 70. As described above, comparator 19 may be a phase comparator to produce an error signal representing the phase relationship, such as the phase difference, between the VCO output and the horizontal synchronizing signals. This error signal is supplied via low pass filter 17 and contact R of change-over switch $SW_3$ as a control signal for VCO 12. Thus, during recording, as previously described with reference to FIG. 1, VCO 12, frequency divider 16 and comparator 19 form an automatic frequency control (AFC) circuit by which the oscillating signal from VCO 12 is synchronized with the horizontal synchronizing signals $P_H$ of the color video signal being recorded and is maintained at a frequency of $175f_H$.

The record/playback switches $SW'_1$ and $SW_3$ and $SW_6$ are preferably ganged or interconnected so as to be simultaneously changed over from their recording positions, in which the movable contacts of each of the switches engage respective recording contacts R, to their reproducing or playback positions shown in FIG. 2, and in which the movable contacts engage respective playback contacts P. In the reproducing mode of operation of the apparatus shown in FIG. 2, the signals alternately reproduced by heads $H_A$ and $H_B$ from the successive tracks on tape T are transmitted by way of playback contacts P of switch SW'$_1$ to playback amplifiers 76$_A$ and 76$_B$, respectively. The outputs of playback amplifiers 76$_A$ and 76$_B$ are alternatively applied through switching circuits 77$_A$ and 77$_B$, respectively, to an adding or combining circuit 78, and the switching circuits 77$_A$ and 77$_B$ are oppositely controlled by the rectangular waveform or signal S$_V$ from flip-flop 73. More particularly, switching circuits 77$_A$ and 77$_B$ are closed and opened, respectively, as shown in FIG. 2, only during each field interval when signal S$_V$ is of a high level, while switching circuits 77$_B$ and 77$_A$ are closed and opened, respectively, only during each field interval when signal S$_V$ is of a low level. Since flip-flop 73 changes state at the field interval repetition rate, the field intervals of the signals alternately reproduced by heads H$_A$ and H$_B$ are transmitted in sequence from the output of mixing circuit 78 to both a high pass filter 79 and a low pass filter 80. The filters 79 and 80 respectively separate the frequency modulated luminance component Y$_{FM}$ and the frequency converted chrominance component S$_j$ from the reproduced signals. The frequency modulated luminance component Y$_{FM}$ separated from the reproduced signals is passed through a limiter 81 to a frequency demodulator 82 so as to obtain a demodulated luminance component. The demodulated luminance component is then passed through a low pass filter 83 and a de-emphasis circuit 84 which has a characteristic substantially complementary to that of the pre-emphasis circuit 60. The resulting de-emphasized luminance component is then applied to an adding or mixing circuit 85.

The frequency converted chrominance component S$_j$ separated from the reproduced signals by filter 80 is applied through an automatic color control circuit 86 to a frequency reconverter 11" which may be of a type similar to that described with respect to frequency converter 11 in FIG. 1. The frequency reconverter alternately receives the frequency converting signals +S$_q$ and −S$_q$ from switching circuit 74, and by which the carrier of the reproduced chrominance component S$_j$ is reconverted from its low frequency f$_c$ to the original carrier frequency f$_S$. The resulting frequency reconverted chrominance component is passed successively through a band pass filter 87 and then a comb filter 88 in which, as hereinafter described in detail, chrominance components of crosstalk signals are cancelled or suppressed so that only the chrominance component of the video signal being reproduced from a particular track by the head H$_A$ or H$_B$, respectively, is passed to mixing circuit 85 for combining in the latter with the demodulated luminance component and thereby forming the desired reproduced color video signal applied to an output terminal 89. The output of the comb filter is transmitted to mixing circuit 85 by a color killer circuit 96 which may be a conventional color killer circuit adapted to suppress or mute the application of an output from the chrominance channel to the mixing circuit in the event that the chrominance component is of a low level, for example, having a poor S/N ratio, or in the event that the reproduced video signal is a monochrome (black-and-white) signal. This avoids imparting undesired noise components to the luminance component. To this effect, a color detector circuit 97 is coupled to automatic color control circuit 86 for detecting whether the chrominance subcarrier, such as the burst signal, exceeds a threshold amplitude level. If the amplitude of the chrominance subcarrier exceeds this threshold level, color detector circuit 97 produces an output signal which inhibits color killer circuit 96. If the chrominance subcarrier does not exceed this threshold level, color detector circuit 97 activates the color killer circuit.

The output of color killer circuit 96 is also shown to be supplied to the burst gate 20 of processing circuit 10 which extracts burst signals from the reconverted chrominance component and applies the extracted burst signals to one input of a phase comparator 21 which, at its other input, receives the reference oscillating signal with the standard color subcarrier frequency f$_s$ from reference oscillator 15. The output of phase comparator 21, determined by a phase comparison of the extracted burst signals with the reference oscillating signal from oscillator 15, is applied through low pass filter 22 as a DC phase error signal to the phase error contact P of switch 23 for transmission through the latter to the P contact of switch SW$_3$, in the reproducing or playback mode of operation, to VCO 12. It will be apparent that, in the playback or reproducing mode of operation, any phase difference between burst signals extracted by gate 20 from the reconverted chrominance component and the output of reference oscillator 15 causes comparator 21 to apply a suitable DC voltage to VCO 12 for effecting a required change in the phase of the frequency converting signals +S$_q$ and −S$_q$, whereby to achieve an automatic phase control function for eliminating so-called jitter from a picture or image reproduced by a color cathode ray tube in response to color video signals obtained at output terminal 89.

In the playback or reproducing mode of operation of the apparatus shown in FIG. 2, control signal S$_x$ for operating switching circuit 74 is again obtained from OR circuit 72 in response to the rectangular waveforms or control signals S$_H$ and S$_V$ from flip-flops 71 and 73, respectively. As before, flip-flop 73 is alternately set and reset by pulses from pulse generators PG$_1$ and PG$_2$, respectively, in synchronism with the rotational positioning of heads H$_A$ and H$_B$, respectively, and thus in synchronism with the reproduced field intervals. However, in the playback mode of operation, the reproduced color video signals from mixing circuit 85 are applied through contact P of switch SW$_6$ to separator 70 so that the comparison by comparator 19 and the triggering of flip-flop 71 occur in response to the horizontal synchronizing signals P$_H$ separated from the reproduced color video signals.

As previously described in connection with the recording mode of operation, in the playback mode of operation the oscillating signal from VCO 12 is frequency-divided in divider 13 and then frequency converted in frequency converter 14 with the reference oscillating signal from reference oscillator 15 to form the frequency converting signal having the frequency f$_S$+(44−¼)f$_H$ and which is supplied to frequency reconverter 11". Thus, during playback or reproducing, the frequency reconverter 11", frequency converter 14, oscillators 12 and 15 and phase comparator 21 form an automatic phase control circuit (APC) by which small time base errors, such as phase errors, included in the reproduced chrominance component are cancelled or eliminated from the reconverted chrominance component.

As previously described with reference to FIG. 1, the output of comparator 19 is supplied through low pass filter 17 as a frequency error signal to the frequency error contact F of switch 23 for transmission through the latter to the P contact of switch SW$_3$, in the reproducing or playback mode of operation, to VCO 12. Switch 23 is controlled by switch control signal $S_R$, produced by an OR circuit 27 to be described, to be conditioned to a first condition whereby contact F thereof is connected to VCO 12 and to a second condition whereby contact P thereof is connected to VCO 12. Thus, switch 23 is adapted to supply either the frequency error signal or the phase error signal to the VCO as a control signal therefor.

When the apparatus shown in FIG. 2 is operated to record the color video signal applied to input terminal 55, the alternative application to frequency converter 11' of frequency converting signals $+S_q$ and $-S_q$ of opposed phase or polarity is effective in converter 11' to provide the resulting frequency converted chrominance component $S_j$ with respective carriers $C_a$ and $-C_a$ which are similarly of opposed phase or polarity. By reason of the previously described configuration of control signal $S_x$ for switching circuit 74, during each field interval recorded by head $H_A$, converting signal $+S_q$ is continuously applied to frequency converter 11' with the result that the successive intervals of each field interval recorded by head $H_A$ in a respective track are provided with a carrier $C_a$ of constant polarity. On the other hand, during successive line intervals of each field interval recorded by head $H_B$ in a respective track, frequency converting signals $+S_q$ and $-S_q$ are alternately applied to frequency converter 11' so that the successive line intervals of each field interval recorded by head $H_B$ are alternately recorded with the carriers $C_a$ and $-C_a$ of opposed polarity.

As is well known, the interfering signal due to crosstalk in respect to the luminance component of the color video signal may be eliminated, at least in part, by providing heads $H_A$ and $H_B$ with air gaps having different azimuth angles. Further, as is well known, a suitable servo system may be provided for controlling rotation of heads $H_A$ and $H_B$ so that the control signal $S_x$ which controls switching circuit 74 has the same relationship to the operative positioning of heads $H_A$ and $H_B$ during reproducing as it has during recording.

Considering the frequency converted chrominance component of the recorded color video signal, it should be noted that the effect of providing the same with carriers $C_a$, $-C_a$ of reversed phase or polarity in successive line intervals or areas of each track recorded by head $H_B$ is the same as providing such frequency converted chrominance component with a new carrier frequency converted chrominance component with a new carrier $C_b$ having frequency components offset by $\frac{1}{2}f_H$, or interleaving with respect to the frequency components of the carrier $C_a$ with which the frequency converted chrominance component is recorded in the next adjacent track by head $H_A$, as described in detail in U.S. Pat. No. 3,925,801. Accordingly, in the reproducing operation of the apparatus shown in FIG. 2, when, for example, head $H_A$ scans a track on tape T for reproducing the frequency converted chrominance component recorded therein with the carrier $C_a$, the undesired or crosstalk signal simultaneously reproduced by head $H_A$ from a next adjacent track originally recorded by the head $H_B$ has its frequency converted chrominance component provided with a carrier $C_b$ in frequency interleaving relation to the carrier $C_a$.

As previously noted, during the reproducing operation of the apparatus in FIG. 2, switching circuit 74 is again controlled by control signal $S_x$ from OR circuit 72 so that frequency converter 11'' continuously receives frequency converting signal $+S_q$ during the scanning of a track by head $H_A$, and frequency converting signals $+S_q$ and $-S_q$ are alternately applied to frequency reconverter 11'' for successive line intervals during the scanning of a track by head $H_B$. As a result of the foregoing, during the scanning of a track by head $H_A$, frequency reconverter 11'' reconverts the carrier $C_a$ of the chrominance component then being reproduced to a carrier having the original or standard carrier frequency $f_S$, while the carrier $C_b$ of the crosstalk chrominance component has its frequency similarly shifted so as to be spaced midway between the principal sidebands of the desired carrier. Similarly, during the scanning of a track by head $H_B$, frequency reconverter 11'' frequency converts the carrier $C_b$ of the chrominance component being reproduced from such track to a carrier also having the original or standard frequency $f_S$, while the carrier $C_a$ of the crosstalk chrominance component then being reproduced has its frequency shifted so as to be spaced midway between the principal sidebands of the desired reconverted carrier. Thus, the reconverted carriers of the chrominance component reproduced during alternate field intervals both have the same carrier frequency $f_S$, while the chrominance component of the undesired or crosstalk signal is, in each case, spaced midway between the principal sidebands of the desired carrier so as to be eliminted by comb filter 88 and thereby yield the desired reconverted chrominance component free of any crosstalk chrominance component.

Returning to switch 23 and the manner in which this switch is controlled by control signal $S_R$ in order to selectively couple the frequency or phase error signals to VCO 12 via the playback contact P of switch $SW_3$ during a reproducing mode, it is seen that OR circuit 27 includes one input coupled to a frequency discriminator 26 and another input coupled via a switching circuit 28 to a frequency divider comprised of flip-flop 73 and a frequency divider circuit 29. Frequency discriminator 26 has its input coupled to a control transducer or head 25 which, in turn, is adapted to reproduce those control signals which normally are recorded in a longitudinal track on tape T during a recording operation of the VTR apparatus. One of ordinary skill in the art will recognize that these control signals are synchronized with the field or frame repetition rate and are derived from the vertical synchronizing signal which is included in the video signal that is recorded by the illustrated apparatus. The purpose of this control signal typically is to control the relative tape transport speed of tape T during signal reproduction. These reproduced control signals also are applied to frequency discriminator 26 which has a voltage-frequency characteristic such that the frequency discriminator produces an output signal of relatively low level when the frequency of the control signals applied thereto is equal to a predetermined frequency, that is, the frequency to which frequency discriminator 26 is tuned, and produces an output signal of relatively high level when the frequency of the control signals applied thereto differs from this predetermined frequency. As may be appreciated, when the tape drive apparatus initially is energized, the transport speed of tape T gradually increases. Hence, during this initial turn-on interval, the frequency of the control signals which are reproduced by transducer 25 gradually increases until such frequency is equal to the tuned frequency of the frequency disciminator. Accordingly, during this initial turn-on interval, frequency discriminator 26 produces an output signal of relatively high level which then is reduced to a low level signal. Similarly, when the tape drive apparatus is de-energized, or when the apparatus is changed from a normal reproducing mode to a slow-motion or stop mode, the transport speed of tape T gradually is reduced so as to correspondingly reduce the frequency of the control signals that are reproduced by the transducer 25. This, in turn, results in an increase in the output signal level produced by frequency discriminator 26. Thus, frequency discriminator 26 produces an output signal representing that tape T is being driven at its proper transport speed.

The output of frequency discriminator 26 also is coupled to a control input of a muting switch 98. This muting switch is connected to output terminal 89 and is adapted to mute or inhibit the signal output of the illustrated video signal reproducing apparatus in the event that tape T is not driven at its proper transport speed.

Switching circuit 28 is represented as a switch having stationary contacts B and C and a movable contact selectively engageable with either of its stationary contacts. The state of switching circuit 28, that is, the particular stationary contact which is engaged by the movable contact, is determined by the output of color detector circuit 97. More particularly, when the color detector circuit detects that the chrominance subcarrier included in the reproduced video signal exceeds the aforementioned threshold level, an output signal is produced and is applied to switching circuit 28, whereby the switching circuit assumes a first state to connect contact C to OR circuit 27. In the event that the reproduced video signal is a monochrome (black-and-white) signal, or in the event that the chrominance subcarrier in the reproduced video signal is less than the threshold level, color detector circuit 97 applies a signal to switching circuit 28, whereby the switching circuit assumes a second state to connect contact B to OR circuit 27.

It is recalled that pulse generators PG$_1$ and PG$_2$ provide respective set and reset pulses for flip-flop 73 in accordance with the speed of rotation of heads H$_A$ and H$_B$, respectively. Thus, pulse generator PG$_1$ produces pulses having a repetition rate equal to the angular velocity of head H$_A$, for example, a frequency of 30Hz. Pulse generator PG$_2$ produces similar pulses, also having a frequency of 30Hz. but phase displaced by 180° from the pulses produced by pulse generator PG$_1$. As a result of these set and reset pulses applied to flip-flop 73, the frequency of control signal S$_V$ produced by the flip-flop is synchronized with the field repetition rate of the recorded video signal and is equal to the frame repetition rate, or 30Hz. This is because, in a typical VTR, each head H$_A$ and H$_B$ scans a respective track, and a single field interval is recorded in each track. Since a given head scans every other field interval, the frequency of the pulses produced by each of the pulse generators is equal to the repetition rate of every other field interval, which is equal to the frequency of the frame repetition rate. Control signal S$_V$ is applied directly to contact B of switching circuit 28 and through divide-by-five frequency divider 29 to contact C of the switching circuit.

The manner in which switch 23 is controlled during a reproducing mode of operation now will be described with reference to the waveform diagram shown in FIGS. 3A–3D. Flip-flop 73, which is set by the pulses generated by pulse generator PG$_1$ and which is reset by the pulses generated by pulse generator PG$_2$, produces control signal S$_V$ shown in FIG. 3A. It is appreciated that the duty cycle of control signal S$_V$ is equal to 50%, with each positive pulse duration being equal to one field interval and with each negative pulse duration also being equal to one field interval. Control signal S$_V$ is applied directly to contact B of switching circuit 28, and the frequency of this control signal is divided by a factor of five and supplied as a control signal P$_G$ (FIG. 3B) to contact C of the switching circuit. The frequency of control signal P$_G$ is one-fifth the frequency of control signal S$_V$ and is equal to one-tenth the field repetition rate. That is, control signal P$_G$ is synchronized with the field repetition rate and is represented as one positive pulse during every ten field intervals. The duration of this positive pulse also is equal to one field interval, and the separation between successive positive pulses in control signal P$_G$ is equal to nine field intervals.

Let it be assumed that the illustrated apparatus reproduces a composite color video signal with a chrominance subcarrier that exceeds the aforementioned threshold level. Hence, color detector circuit 97 controls the state of switching circuit 28 such that control signal P$_G$ is connected via contact C to OR circuit 27 and is applied as the switch control signal S$_R$ shown in FIG. 3D. This switch control signal controls switch 23 such that the illustrated movable contact thereof engages contact F only during each positive pulse duration of switch control signal S$_R$. This means that the frequency error signal derived from comparator 19 supplied to VCO 12 during one out of every ten field intervals, and the phase error signal which is derived from comparator 21 is applied to the VCO during the remaining nine field intervals. This periodic application of the frequency error signal to VCO 12 assures that the reproduced chrominance component is corrected such that the time base error in the reproduced chrominance component is maintained within the lock-in range of the APC circuit. Of course, the application of the phase error signal to the VCO results in eliminating the time base phase and frequency errors in the reproduced chrominance component.

If the reproduced video signal is a monochrome signal, or if the chrominance subcarrier does not exceed the aforementioned threshold level, then color detector circuit 97 controls switching circuit 28 such that the illustrated movable contact thereof engages contact D, thereby applying control signal S$_V$ (FIG. 3) to OR circuit 27. This, in turn, results in switch control signal S$_R$ having the waveform shown in FIG. 3C, this switch control signal alternating between its relatively high and low levels in synchronism with the field repetition rate and at a frequency equal to the frame repetition rate. Thus, switch 23 is conditioned to apply the frequency error signal and then the phase error signal to VCO 12 during successive field intervals. Of course, this has no effect upon the reproduced monochrome video picture since VCO 12 is used in the AFC and APC circuits for eliminating time base errors in the reproduced chrominance component. Furthermore, when color detector circuit 97 detects the absence of a satisfactory chrominance subcarrier, color killer circuit 96 is activated to inhibit the display of spurious colors in the event that the reproduced video picture is displayed on a color television receiver.

Figure 3A:
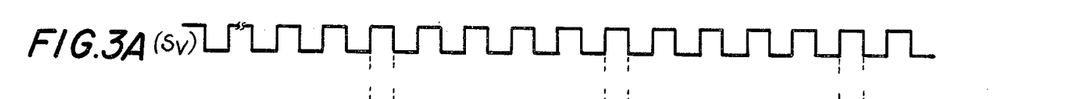
FIGS. 3A–3D are waveform diagrams which are helpful in understanding the operation of a portion of the apparatus shown in FIGS. 1 and 2.
Figure 3B:
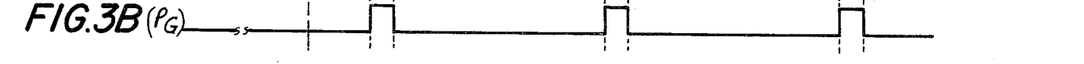
Figure 3C:
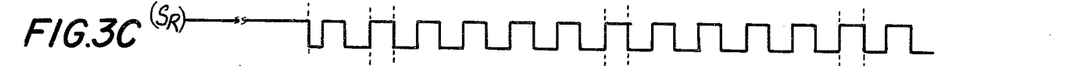
Figure 3D:
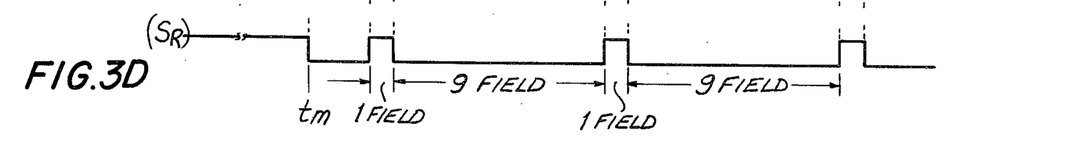

When the tape drive apparatus is, for example, initially started up, frequency discriminator 26 detects when tape T attains its proper transport speed. Prior to attaining this proper transport speed, a relatively high level is applied by the frequency discriminator to OR circuit 27, resulting in a switch control signal $S_R$ of correspondingly high level, as represented in FIGS. 3C and 3D prior to time $t_m$. At time $t_m$, it is assumed that tape T has reached its proper transport speed, resulting in a relatively low level output signal from frequency discriminator 26. Thus, prior to time $t_m$, OR circuit 27 is inhibited from responding to either of control signals $S_V$ and $P_G$ which may be applied thereto by switching circuit 28. Subsequent to time $t_m$, OR circuit 27 is enabled to respond to either of these control signals. Consequently, prior to time $t_m$, switch 73 is maintained in condition to supply the frequency error signal to VCO 12.

It is appreciated that flip-flop 73 and frequency divider 29 cooperate to produce signal $P_G$ which represents every tenth field interval in the reproduced video signal. If desired, a different frequency dividing ratio can be selected such that control signal $P_G$ represents every n-th field interval, where n is any positive integer such that VCO 12 is suitably controlled to correct time base errors such that the time base errors included in the reproduced video signal are within the lock-in range of the APC circuit. Also, the frequency of control signal $S_V$ may be applied to contact B of switching circuit 28 by another frequency divider of any suitable frequency dividing ratio.

While the present invention has been particularly shown and described with reference to a preferred embodiment thereof, it will be readily apparent to one of ordinary skill in the art that various changes and modifications in form and detail may be made without departing from the spirit and scope of the invention. For example, the oscillating frequency of VCO 12 may be selected to be equal to the frequency of the horizontal synchronizing signal, and a frequency multiplier can be used in place of frequency divider 13. As an another alternative, reference oscillator 15 may have a different oscillating frequency and may be coupled to phase comparator 21 and to frequency converter 14 by other frequency-changing circuits, such as frequency multipliers, frequency dividers, or the like. As a further example, switching circuit 28 may be omitted, and OR circuit 27 may be supplied with control signal $P_G$ directly. Of course, it is contemplated that suitable solid-state switching devices can be used to implement each of the illustrated switches and switching circuits.

It also should be understood that the present invention need not be limited solely to video signal reproducing apparatus. Rather, this invention is readily adapted to eliminate time base errors from virtually any information signal, such as any carrier-modulated information signal, regardless of whether that information signal is being reproduced from a record medium or is otherwise supplied to the time base error correcting apparatus disclosed herein.

Therefore, it should be readily understood that the appended claims should be interpreted to cover the foregoing as well as various other changes and modifications.

What is claimed is:

1. Apparatus for eliminating time base errors from a carrier-modulated information signal, comprising:
    means including variable oscillating means for generating a carrier signal of controllable frequency and phase;
    automatic frequency control means for detecting a time base frequency error in said carrier-modulated information signal and for producing a frequency error signal proportional to said detected frequency error;
    automatic phase control means for detecting a time base phase error in said carrier-modulated information signal and for producing a phase error signal proportional to said detected phase error;
    switch means for selectively supplying either said frequency error signal or said phase error signal as a control signal to said variable oscillating means to correspondingly control the frequency and phase of said generated carrier signal;
    switch control means for controlling said switch means to supply said frequency and phase error signals to said variable oscillating means during selected, mutually exclusive intervals; and
    converting means supplied with said information signal and said generated carrier signal to convert the carrier of said carrier-modulated information signal such that the converted carrier has substantially constant frequency and phase.

2. The apparatus of claim 1 wherein said means for generating a carrier further includes a reference oscillator for generating a reference carrier of substantially fixed frequency and phase; and means for frequency converting said reference carrier with the output of said variable oscillating means to produce said carrier signal of controllable frequency and phase.

3. The apparatus of claim 2 wherein the frequency of said carrier signal produced by said means for frequency converting said reference carrier is equal to the sum of the frequency of said reference carrier and the frequency of said output of said variable oscillating means.

4. The apparatus of claim 2 wherein said automatic phase control means comprises a phase comparator having one input coupled to the output of said converting means to receive the frequency converted carrier-modulated information signal and another input coupled to said reference oscillator to receive said reference carrier, said phase comparator further having an output coupled to said switch means for supplying said phase error signal proportional to the phase difference between said frequency converted information signal and said reference carrier to said switch means.

5. The apparatus of claim 2 wherein said automatic frequency control means comprises a phase comparator having one input connected to receive a predetermined frequency component included in the information signal and another input connected to receive an oscillating signal derived from said variable oscillating means and having a frequency substantially equal to that of said predetermined frequency component, said phase comparator further having an output coupled to said switch means for supplying said frequency error signal proportional to the phase difference between said predetermined frequency component and said derived oscillating signal to said switch means.

6. The apparatus of claim 1 wherein said carrier-modulated information signal is the chrominance component of a composite color video signal containing burst signals and horizontal synchronizing signals; said automatic phase control means includes burst signal extracting means for extracting the burst signals from the frequency converted chrominance component, a reference oscillator for generating a reference carrier of substantially fixed frequency and phase, and a phase comparator for comparing the phase of said extracted burst signal with the phase of said reference carrier to derive said phase error signal from said comparison; and said automatic frequency control means comprises means for comparing an oscillating signal derived from said variable oscillating means with said horizontal synchronizing signals to produce said frequency error signal as a function of the difference therebetween.

7. The apparatus of claim 6 wherein the frequency of the output signal produced by said variable oscillating means is greater than the frequency of said horizontal synchronizing signals, and said automatic frequency control means further comprises frequency dividing means for dividing the frequency of said output signal produced by said variable oscillating means to be substantially equal to the frequency of said horizontal synchronizing signals, and said comparing means in said automatic frequency control means comprises a phase comparator for comparing the phase of the frequency-divided output signal produced by said frequency dividing means with the phase of said horizontal synchronizing signals.

8. The apparatus of claim 6 wherein said composite color video signal is reproduced from a record medium by rotary transducer means, said composite color video signal being recorded in parallel tracks, each track containing a predetermined number of field intervals, and wherein said record medium is translatable with respect to said rotary transducer means, said apparatus further comprising means for sensing when the speed of translation of said record medium relative to said transducer means is other than a predetermined speed; and said switch control means comprising means for producing a periodic signal in synchronism with the reproduced field intervals, frequency dividing means responsive to said periodic signal for deriving a control pulse signal whose frequency is a fraction of the frequency of said periodic signal, means for maintaining said switch means in condition to supply said frequency error signal to said variable oscillating means when the speed of translation of said record medium relative to said transducer means is other than said predetermined speed, and means for switching said switch means to supply said frequency error signal and said phase error signal, respectively, to said variable oscillating means in accordance with the level of said control pulse signal.

9. Apparatus for recording and/or reproducing, in successive parallel tracks on a record medium, a color video signal including luminance and chrominance components, burst signals and horizontal synchronizing signals, said color video signal being divided into field intervals, said apparatus comprising:
rotary transducer means for scanning said successive tracks and being operative to reproduce said color video signal therefrom, said record medium being translatable with respect to said rotary transducer means;
means for separating said chrominance component from said reproduced color video signal and including frequency converting means for converting the carrier frequency of said chrominance component;
means for separating said horizontal synchronizing signals from said reproduced color video signal;
automatic frequency control means including a variable oscillator for detecting a frequency error between said separated horizontal synchronizing signals and the output derived from said variable oscillator and for producing a frequency error signal as a function of said detected frequency error;
automatic phase control means including a reference oscillator for detecting a phase error between the burst signals included in said reproduced color video signal and a reference oscillating signal produced by said reference oscillator and for producing a phase error signal as a function of said detected phase error;
switch means having a first condition to supply said frequency error signal to said variable oscillator as a control signal therefor and having a second condition to supply said phase error signal to said variable oscillator as a control signal therefor, whereby the frequency and phase of the variable oscillator output is controlled by said control signal;
switch control means for controlling the condition of said switch means as a function of the field intervals of said reproduced color video signal; and
means for combining said reference oscillating signal and said variable oscillator output to form a frequency converting signal and for supplying said frequency converting signal to said frequency converting means.

10. The apparatus of claim 9 wherein said switch control means includes means for detecting every n-th field interval in said reproduced color video signal, where n is an integer; means for conditioning said switch means to the first condition thereof during each n-th field interval; and means for conditioning said switch means to the second condition thereof during the remaining field intervals.

11. The apparatus of claim 10 wherein said means for detecting every n-th field interval comprises pulse generating means for generating periodic pulses in synchronism with the field intervals in said reproduced color video signal; and frequency divider means coupled to said pulse generating means for producing a control pulse whose frequency is 1/n the field repetition rate of said field intervals in said reproduced color video signal, said control pulse having a duration equal to one field interval.

12. The apparatus of claim 11 wherein said means for conditioning said switch means to the first condition thereof comprises means for applying said control pulse to said switch means, said switch means additionally being responsive to the absence of a control pulse to be conditioned to the second condition thereof.

13. The apparatus of claim 10 wherein said switch control means further includes means for sensing when the speed of translation of said record medium with respect to said rotary transducer means is other than a predetermined speed; and means for maintaining said switch means in the first condition thereof when said speed of translation is other than said predetermined speed.

14. The apparatus of claim 13 wherein said record medium is provided with spaced apart indicia thereon; and said means for sensing when the speed of translation of said record medium with respect to said rotary transducer means is other than a predetermined speed comprises a sensor for sensing said indicia when said record medium is translated with respect to said rotary transducer means, and frequency discriminating means for discriminating the frequency of said sensed indicia to produce an output signal when said discriminated frequency differs from a predetermined frequency.

15. The apparatus of claim 9 wherein said automatic frequency control means comprises phase comparator means for comparing the phases of respective signals applied thereto and for producing said frequency error signal in accordance with said phase comparison; means for applying said separated horizontal synchronizing signals to one input of said phase comparator means; and frequency dividing means coupled to another input of said phase comparator means and responsive to the output of said variable oscillator for applying a divided-frequency oscillating signal to said other input of said phase comparator means.

16. The apparatus of claim 9 wherein said automatic phase control means comprises phase comparator means for comparing the phases of respective signals applied thereto and for producing said phase error signal in accordance with said phase comparison; means for applying said reference oscillating signal to one input of said phase comparator means; and burst signal extracting means for extracting said burst signals from the frequency-converted chrominance component produced by said frequency converting means and for applying said extracted burst signals to another input of said phase comparator means.

17. The apparatus of claim 9 wherein said means for combining said reference oscillating signal and said variable oscillator output comprises additional frequency converting means for providing said frequency converting signal with a frequency equal to the sum of the frequencies of said reference oscillating signal and said variable oscillator output.

18. The apparatus of claim 9 wherein said rotary transducer means are additionally operative to record said color video signals, said apparatus further comprising a chrominance recording channel including recording frequency converting means for converting the carrier frequency of said chrominance component during a recording operation; first change-over switch means operative during a recording operation to supply said color video signal containing the frequency-converted chrominance component to said rotary transducer means and operative during a reproducing operation to supply said color video signal from said rotary transducer means to said means for separating said chrominance component; second change-over switch means operative during a recording operation to supply the color video signals for recording to said means for separating said horizontal synchronizing signals and operative during a reproducing operation to supply the reproduced color video signals to said means for separating said horizontal synchronizing signals; and third change-over switch means operative during a recording operation to supply only said frequency error signal to said variable oscillator and operative during a reproducing operation to supply the output of said switch means to said variable oscillator, and wherein said frequency converting signal formed by said means for combining said reference oscillating signal and said variable oscillator output additionally is supplied to said recording frequency converting means.

19. The apparatus of claim 18; wherein said means for combining includes means for providing said frequency converting signal with different first and second frequency converting carriers for said chrominance component, carrier selecting means for alternatively selecting the first and second carriers for said chrominance component, and control means for the carrier selecting means operative to cause the recording of said chrominance component with the first and second carriers therefor, respectively, in said tracks which are next adjacent each other.

20. The apparatus of claim 19 wherein said rotary transducer means are operative during a reproducing operation to reproduce the chrominance component recorded in each of the tracks along with crosstalk signals from tracks next adjacent thereto; said apparatus including means for providing the chrominance component reproduced from each of said tracks with a common carrier and for eliminating the crosstalk signals therefrom on the basis of said different first and second carriers with which the chrominance component is recorded in the tracks which are next adjacent each other.

21. The apparatus of claim 20 in which said means for eliminating the crosstalk signals includes a comb filter.

22. The apparatus of claim 19 in which said first and second carriers for the chrominance component have different polarity characteristics.

23. The apparatus of claim 22 in which the polarity of said first carrier for the chrominance component is constant during successive line intervals of the video signal recorded in one of the tracks, and the polarity of the second carrier for the chrominance component is reversed after each predetermined number of said line intervals of the video signal recorded in the next adjacent track.

24. The apparatus of claim 18 in which the original and frequency-converted carrier frequencies of the chrominance component are in frequency interleaving relation to each other and to the horizontal synchronizing signal frequency of the color video signal.

25. The apparatus of claim 24 in which said frequency-converted carrier frequency is lower than said original carrier frequency and has its second harmonic in frequency interleaving relation to said horizontal synchronizing signal frequency of the color video signal.

26. The apparatus of claim 9 further comprising color detecting means for detecting whether a chrominance component is included in the reproduced video signal and for modifying the operation of said switch control means in accordance with said detection.

27. The apparatus of claim 26 wherein said detecting means produces a color killer signal in the absence of a chrominance component in said reproduced video signal; and said switch control means includes means for conditioning said switch means to the first condition thereof during each n-th field interval in the reproduced color video signal and to the second condition thereof during the remaining field intervals, where n is an integer, and means for conditioning said switch means to the first condition thereof during at least every alternate field interval in response to said color killer signal.

28. Apparatus for eliminating time base errors from a carrier-modulated information signal, comprising:
means including variable oscillating means for generating a carrier signal of controllable frequency and phase;
automatic frequency control means for detecting a time base frequency error in said carrier-modulated information signal and for producing a frequency error signal proportional to said detected frequency error;
automatic phase control means for detecting a time base phase error in said carrier-modulated information signal and for producing a phase error signal proportional to said detected phase error;

switch means for normally supplying said phase error signal as a control signal to said variable oscillating means and to selectively supply said frequency error signal as a control signal, to correspondingly control the frequency and phase of said generated carrier signal;

switch control means for controlling said switch means to supply said frequency and phase error signals to said variable oscillating means; and converting means supplied with said information signal and said generated carrier signal to convert the carrier of said carrier-modulated information signal such that the converted carrier has substantially constant frequency and phase.

* * * * *